United States Patent Office.

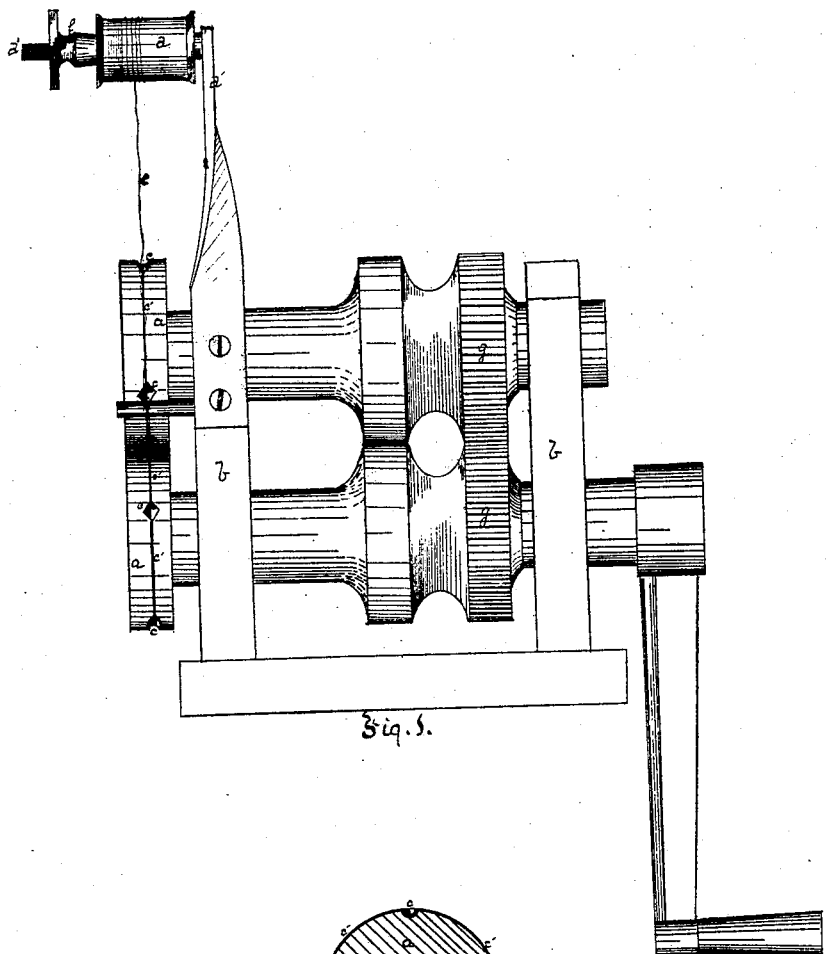
S. Hart,
Soft Rubber.
No. 99,083. Patented Jan. 25, 1870.
Witnesses:
E. C. Fitler
R. C. Morenshall
Inventor:
Samuel Hart,
by Bakewell & Kerr,
his Atty's.

SAMUEL HART, OF MARIETTA, OHIO.

Letters Patent No. 99,083, dated January 25, 1870.

---

IMPROVEMENT IN MOULDING AND GLAZING FORMS MADE OF PLASTIC MATERIAL.

---

The Schedule referred to in these Letters Patent and making part of the same.

---

*To all whom it may concern:*

Be it known that I, SAMUEL HART, of the city of Marietta, in the county of Washington, and State of Ohio, have invented a new and useful Improvement in Moulding and Glazing Forms Made of Plastic Material; and I do hereby declare the following to be a full, clear, and exact description thereof, reference being had to the accompanying drawings, making a part of this specification, in which—

Figure 1 is a side elevation of the devices I employ, and

Figure 2 is a cross-section through the dies, in the plane of the matrices or moulds.

Like letters of reference indicate like parts in each.

The nature of my invention consists in the process of reducing a mass or quantity of plastic material to a continuous succession of fixed forms, so as to be convenient for further treatment, by coating, coloring, glazing, or otherwise; and also in the construction of dies with suitably-shaped cavities, connected together by a fine groove, for use in moulding such forms continuously on a thread or wire.

To enable others skilled in the art to make and use my invention, I will proceed to describe its construction and manner of use.

In the frame or housing $b$, I mount the cylinders $a$, and operate them by any suitable mode of applying power, as through gear-wheels $g$.

I apply my invention, among other uses, to the manufacture of ornamental forms, of small size, for mouldings for fine cabinet-work, to making lozenges, pills, artificial seeds, &c., from medical ingredients in a plastic state, or to reducing plastic medical compositions to any desired fixed forms.

For the purpose of making such medicines more attractive, or, rather, less distasteful, I make them in the form of seeds, grains, or berries, or in such other forms that their appearance will rather please than be repugnant to the taste of the patient.

Such forms I mould on a thread, so that they will be more convenient for glazing or coating with or dipping into some solution pleasant to the taste.

Hence, I make, in the rollers $a$, a series of cavities, $c$, corresponding to each other in position, and of such shape that the plastic material worked therein, will be reduced to any desired form or variety of forms, so as to appear to be grains, seeds, or berries, &c., or will be like pills or lozenges of the usual or any known form.

These cavities $c$, I connect together by a small thread-like groove, $c'$, in which to carry a thread, $e$, along from one to the other, the thread being unwound from a spool, $d$, which is adjusted on an elevated spindle, $d'$, by a tension-screw, $f$.

In operating the machine, the mass or mixture is fed in between the dies or rollers by hand, or a grooved feeding-wheel may be substituted therefor, or other suitable device may be employed for that purpose.

In this way, I produce a series of small bodies, of any desired form or variety of forms, continuously on a thread, and then subject them to any further desired treatment, by dipping them into a mucilaginous or other glazing-solution, to prevent the escape of the aroma or of the healing properties, which solution may be flavored, so as to impart to the articles a pleasant taste.

When the articles are dried, the thread may be severed close to each article on either side, when they are ready to be packed, sold, or used, or they may be packed in that condition, and be cut off as wanted for use.

As already stated, I apply my process and machine to the moulding or shaping on a cord or wire, in a continuous series, of other plastic materials, for any and all known uses.

The thickness or consistency of the material to be worked, should be such that it will readily retain the form or forms into which it is to be made.

The cavities described may be made in or arranged on a pair of flat dies, instead of on a pair of cylinders, in which case the thread or wire should be laid along the groove $c'$ made for that purpose along the line of the cavities, and the dies operate by a reciprocating motion.

Two or more series of cavities or matrices may be made in the same set of rolls, and each being supplied with a thread, the rapidity of manufacture may be increased to any desired extent.

What I claim as my invention, and desire to secure by Letters Patent, is—

1. Imitation seeds, grains, or berries, made substantially as described, from a plastic compound, for the uses set forth.

2. The process of reducing a mass or quantity of plastic material to a continuous succession of fixed forms, substantially as described.

3. The cavities $c$, in a pair of dies, cylindrical or straight, and connected together by a thread-like groove, $c'$, substantially as and for the purposes set forth.

In testimony whereof, I, the said SAMUEL HART, have hereunto set my hand.

SAM. HART.

Witnesses:
 BENJAMIN MARSHALL,
 JAMES W. NYE.